(12) United States Patent
King

(10) Patent No.: US 8,214,568 B2
(45) Date of Patent: Jul. 3, 2012

(54) DEVICE, SYSTEM, AND METHOD TO COUPLE A PERSONAL DIGITAL ASSISTANT WITH A CAMERA

(76) Inventor: Kevin James King, Vancouver, WA (US)

( * ) Notice: Subject to any disclaimer, the term of this patent is extended or adjusted under 35 U.S.C. 154(b) by 0 days.

(21) Appl. No.: 12/949,748

(22) Filed: Nov. 18, 2010

(65) Prior Publication Data

US 2011/0119409 A1 May 19, 2011

Related U.S. Application Data

(60) Provisional application No. 61/262,536, filed on Nov. 18, 2009.

(51) Int. Cl.
*G06F 3/01* (2006.01)
(52) U.S. Cl. .............................................. 710/72; 710/2
(58) Field of Classification Search ........................ None
See application file for complete search history.

(56) References Cited

U.S. PATENT DOCUMENTS 6,748,165 B2 * 6/2004 Ogasawara ..................... 396/56
7,775,575 B2 * 8/2010 Clark .............................. 296/56

OTHER PUBLICATIONS

Peter Cohen, DSLR Camera Remote for iPhone Controls Canon digital Cameras, Jun. 1, 2009, MacWorld.Com, p. 1.*

* cited by examiner

*Primary Examiner* — Cheng-Yuan Tseng

(57) ABSTRACT

A device system and method is disclosed. The device includes a first USB port configured to couple with a USB port on a camera, and circuitry configured to send USB signals to the camera and/or to receive USB signals from the camera, and to operate in USB Host mode, and/or USB OTG (on the go) mode, as the camera operates in Device mode. The device may also include a second USB port configured to couple with a PDA. The circuitry may be further configured to send USB signals to the PDA and/or to receive USB signals from the PDA, and to operate in USB Host mode, and/or USB OTG mode, as the PDA operates in Device mode.

23 Claims, 5 Drawing Sheets

DEVICE, SYSTEM, AND METHOD TO COUPLE A PERSONAL DIGITAL ASSISTANT WITH A CAMERA

CROSS-REFERENCE TO RELATED APPLICATIONS

The present application claims priority to U.S. Provisional Patent Application No. 61/262,536, filed Nov. 18, 2009, entitled "Method and System to Couple Personal Digital Assistant to Camera for Wireless Radio Flash Operation," the entire disclosure of which is hereby incorporated by reference in its entirety.

FIELD

The present invention relates to photographic devices and equipment that can be used with a camera as an aid for taking photographs, and more specifically to a device, system, and method which may enable a commonly available device, such as a Personal Digital Assistant (PDA), to be used as an additional aid for taking photographs.

BACKGROUND AND SUMMARY

Current camera systems configured to provide wireless functionality can often be limited in terms of connectivity, scalability, adaptability to new emerging technologies, ease of use, convenience, and overall functionality provided to a user. What is needed is a cost effective device system and method which may make use of an interface device such as a Personal Digital Assistant (PDA) which may already be owned by a photographer to provide substantial user functionality, interface options, and connectivity. Embodiments in accordance with the current disclosure may provide an interface that may be used together with a camera and/or additional wireless communication devices to operate, control, monitor, or otherwise interact with various photographic devices.

Embodiments disclosed herein may provide a device, system, and method that may allow a user to couple a personal digital assistant ("PDA") such as but not limited to an Apple® iPhone®, iPod® Touch, BlackBerry®, Palm Pilot®, or similar device to a camera, wherein the device, method and system disclosed herein may allow the camera to operate, and otherwise interact, with other devices, other PDAs, Bluetooth® headsets, computers, cameras, photographic lighting equipment, and other photographic accessories which may be of use in the field of photography, and the like.

Generally, a camera may be unable to directly communicate various signals, such as USB signals, to a PDA and vice versa as both the camera and the PDA may function in a USB "Device" mode. As there may be no USB "Host" between the two, it may not be possible to carry out a USB communication. Additionally, even if the two devices could theoretically directly communicate USB data, the various software and/or firmware of a camera and PDA software of a PDA may not be compatible, or they may communicate various signals using incompatible data or packet structures, and the like.

The current disclosure may describe various capabilities which may be provided by various embodiments of hardware, and various arrangements of hardware components, a communication system, as well as various software processes which may be carried out, utilizing various flow paths of control signals, and the like which may be embodied individually, in whole, in part, or in any combination which may provide useful functionality to a communication system, a camera, one or more lighting devices, or to a user. The current disclosure may describe example embodiments having various new and useful features, design specifications, methods, systems, and functionality. It is considered and will be understood that any individual feature, specification, method, system, or useful function disclosed herein may be embodied on its own, or together with compatible functions, to provide various useful improvement to one or more existing communication systems in the field of photography.

Embodiments in accordance with the current disclosure may make use of any user interface elements or radio wireless communication elements and/or protocols which may be provided by a PDA. A user may interface with various elements of the PDA and may send any desired interface selection or interaction to another device such as, but not limited to, a camera, a computer on the internet or a LAN, various lighting devices or other photographic accessory devices. Automatically, or in response to a user interaction, any setting, status, data, configuration, image, file, viewfinder live preview, or any other indication or data element may be communicated by a camera to another device, or queried by another device of a camera.

Embodiments in accordance with the present disclosure may provide an intermediate element such as a device, apparatus, fixture, or the like, which may include one or more USB interfaces which may be capable of operating in a Host USB mode, or a USB OTG mode. The intermediate device may include a microprocessor, firmware, and various other circuitry.

Various embodiments may be arranged to connect a USB port of the camera to a USB port of an intermediate device (which may be configured to operate in a Host USB mode), and to also connect a USB port of a PDA to a USB port of the intermediate device; wherein a microprocessor of the intermediate device and/or firmware of the intermediate device may be able to communicate, or otherwise structure, data so as to be readable to, or from, a PDA; and also communicate, or otherwise structure, data as to be readable to, or from, a camera, and further to translate various formatting, ordering, or flow of the data between the two such that data or indication from the camera may be available to a user via the PDA and vise versa.

Embodiments may also, or instead, enable the intermediate device to connect to a hot shoe connector of the camera via a mating hot shoe connector such that the intermediate device may be able to communicate signals with the camera via the hot shoe connector of the camera, and may interact with those signals, replace those signals, alter those signals, preview those signals, store those signals, or in any possible way interact with or otherwise manipulate any and/or all data to or from the camera via the hot shoe connector of the camera. Furthermore the intermediate device may be configured to communicate any or all data, status, indication, files, or any other element wirelessly with any other wireless device having a compatible radio signal antenna and receiver via a radio signal antenna and transmitter which may be present internal to or external to the intermediate device. In a similar way, the intermediate device may also, or instead, be configured to transmit any or all, or any portion, of the described data to a coupled PDA which may in turn cause PDA software to operate a radio module of the PDA to relay any, or all, or any portion, of the described data to be sent to another wireless device by various radio frequency bands and protocols such as, but not limited to, 802.11 WiFi, BlueTooth, ZigBee, Machine to Machine ("M2M"), and the like.

Embodiments disclosed herein may provide a device that may include a first USB port configured to couple with a USB port on a camera. The device may include circuitry that may be configured to send USB signals to the camera, and/or to receive USB signals from the camera, and to operate in USB Host mode, and/or USB OTG (on the go) mode, as the camera operates in Device mode. In some cases the circuitry may include a processor. In other cases it may not. The device may also include a second USB port configured to couple with a PDA. The circuitry of the device may be further configured to send USB signals to the PDA, and/or to receive USB signals from the PDA, and to operate in USB Host mode, and/or USB OTG mode, as the PDA operates in Device mode. The circuitry may include various components which may include a microprocessor. In some cases all, or most of the circuitry may be included in the microprocessor.

With some example embodiments the device may include a switching part which may be configured to electrically disconnect the circuitry from the first USB port.

With some example embodiments the device may include a microprocessor configured to cause to be displayed on a display of the PDA an indication of a ratio of light setting between two or more remote lighting devices. The microprocessor may also be configured to receive an adjusted ratio of light settings, and may include a memory configured to store the adjusted ratio of light settings. The microprocessor may also be configured to communicate the adjusted ratio of light settings to the one or more remote lighting devices upon receipt of a shutter activation signal. The ratio of light settings may be adjusted by a user using an interface included with the PDA.

In some cases the microprocessor may be configured to cause the PDA to send exposure information to a wireless access point via an Internet communication protocol wherein the wireless access point may be configured to relay the exposure information to one or more radio signal receiving devices which may be respectively coupled with one or more remote lighting devices.

In some cases the microprocessor may be configured to cause the PDA to send activation and/or trigger information to a wireless access point via an Internet communication protocol wherein the wireless access point may be configured to relay the exposure information to one or more radio signal receiving devices which may be respectively coupled with one or more remote lighting devices.

In some cases the microprocessor may be configured to cause the PDA to send exposure information via WiFi to one or more radio signal receiving devices which may be respectively coupled with, and/or included within, one or more remote lighting devices.

In some cases the microprocessor may be configured to cause the PDA to send activation and/or trigger information via WiFi to one or more radio signal receiving devices which may be respectively coupled with, and/or included within, one or more remote lighting devices.

The term "WiFi" when used herein may be interpreted in a typical way and/or it may be interpreted in a broader sense to be refer to various means of wireless communication such as, for example, communication enabled in accordance with various wireless standards such as IEEE 802.11, and/or via mesh networking architecture, and the like, including various proprietary communication approaches which may utilize standard, or proprietary radio signals which may be sent to and/or from a PDA, or to and/or from any device which may be available to a consumer as an access point.

With some example embodiments the device may include a radio module which may be configured to communicate via radio waves with one or more radio signal receiving devices which may be respectively coupled with one or more remote lighting devices.

The device may include a device hot shoe connector configured to couple with a camera hot shoe connector. The device may also be configured to send signals to and receive signals from the camera via the device hot shoe connector.

Various embodiments may provide a system. The system may include an intermediate device that may be configured to be operatively interposed between a camera and a PDA. The intermediate device may include: a first USB port that may be configured to couple with a USB port on the camera; circuitry that may be configured to send USB signals to the camera and/or to receive USB signals from the camera, and to operate in USB Host mode, and/or USB OTG (on the go) mode, as the camera operates in Device mode; a second USB port that may be configured to couple with the PDA; and the circuitry may be further configured to send USB signals to the PDA and/or to receive USB signals from the PDA, and to operate in USB Host mode, and/or USB OTG mode, as the PDA operates in Device mode. The intermediate device may also include a microprocessor that may be configured to enable the PDA to do one or more of: access image data stored on a memory card of the camera, and to display one or more images captured by the camera on a display of the PDA; copy image data stored on the memory card of the camera to a memory resident on the PDA; activate the camera to capture an image; query settings of the camera; set and/or change settings of the camera; and control a remote piece of photographic equipment.

The term "image" may refer to any photographic data which may include, but may not be limited to for example, JPEG data, proprietary RAW images files, or video.

In some embodiments the system may include a remote lighting device that may be configured to emit a pre-flash of a known intensity to at least partially illuminate a subject in a photographic environment. The camera may be configured to measure an amount of light reflected off the subject including light from the pre-flash, and directed through a lens of the camera. The camera may also be configured to calculate a preferred exposure value for illuminating the subject with a main-flash based on the measured amount of light and to communicate the preferred exposure value as exposure information. The microprocessor of the intermediate device may be further configured to identify the exposure information sent by the camera, and to communicate the exposure information from the intermediate device to the PDA via the second USB port.

The system may also include a wireless access point. The PDA may be configured to send the exposure information from the PDA to the wireless access point using an internet communication protocol. The wireless access point may be configured to relay the exposure information to a remote radio receiving device using radio waves. The remote radio receiving device may be configured to communicate the exposure information to the remote lighting device to cause the flash device to emit the main-flash using the preferred exposure value for illuminating the subject.

In some embodiments the system may include a display on the PDA. The PDA may be configured to: display on the display a ratio of light settings between two or more remote lighting devices; receive a user inputted adjustment of the ratio of light settings; and send the adjusted ratio of light settings to the intermediate device. A radio module may be included in the intermediate device that may be configured to send radio signals to two or more radio signal receiving devices respectively coupled for communication with the two or more remote lighting devices. The intermediate device may be further configured to recognize a shutter activation signal from the camera, and to cause the radio module to send to the two or more radio signal receiving devices the adjusted ratio of light settings in order to cause each respective two or more remote lighting devices to emit flashes of an intensity in accordance with the adjusted ratio of light settings.

In some cases, the intermediate device may be further configured to store the adjusted ratio of light settings in a memory resident on the intermediate device until the shutter activation signal is recognized.

In some embodiments the intermediate device may be further configured to cause thumbnail representations of full size photographic images stored on a memory of the camera to be sent from the camera to the PDA via the intermediate device. In some cases the PDA may include a display and an interface. The PDA may be configured to: display the thumbnail representations on the display; and recognize, from a user using the interface, a selection of one of the thumbnail representations as a selected thumbnail image. The PDA may then be used to cause the camera, through a selection made with the interface on the PDA, to send a full size photographic image corresponding to the selected thumbnail image to the intermediate device; receive an input to send the full size image to a wireless access point and to send the full size image to the wireless access point; and to cause the wireless access point to send the full size image to a computing device coupled with a computer network. The PDA may be configured with one or more computer processor executable programs to perform various components of the actions and/or functions disclosed herein.

Various embodiments may provide a method of using a Personal Digital Assistant (PDA) as a control, or information retrieval, aid in a photographic setup, the method may include: operatively coupling a first USB port of an intermediate device to a USB port of a camera, and operating the intermediate device in USB Host mode as the camera operates in USB Device mode; and operatively coupling a second USB port of the intermediate device to a USB port of the PDA, and operating the intermediate device in USB Host mode as the PDA operates in USB Device mode. The method may then include using the PDA to do one or more of: querying settings of the camera; and setting and/or changing settings of the camera.

In some examples the method may also include: performing one or both of: accessing image data stored on a memory card of the camera and viewing one or more images captured by the camera on a display of the PDA; and copying image data stored on the memory card of the camera to a memory resident on the PDA.

In some examples the method may also include activating the camera to capture an image, and/or controlling a remote piece of photographic equipment.

In some examples the controlling a remote piece of photographic equipment may include: identifying exposure information sent by the camera with the intermediate device; communicating the exposure information from the intermediate device to the PDA; sending the exposure information from the PDA to a wireless access point using an internet communication protocol; relaying the exposure information to a remote radio receiving device with the wireless access point; and communicating the exposure information from the remote radio receiving device to the remote piece of photographic equipment wherein the remote piece of photographic equipment is a flash device responsive to the exposure information. The flash device may respond by emitting a flash of an intensity determined by the exposure information.

In some examples the identifying exposure information sent by the camera may include receiving the exposure information with the intermediate device via a hot shoe connector on the intermediate device mated with a hot shoe connector on the camera.

In some examples the method may also include: displaying a ratio of light settings between two or more remote lighting devices on the display of the PDA; adjusting the ratio of light settings using an interface of the PDA; sending the adjusted ratio of light settings to the intermediate device; storing the adjusted ratio of light settings in a memory resident on the intermediate device; and upon receiving a shutter activation signal from the camera, sending to the two or more remote lighting devices, via radio signals, adjusted lighting settings in accordance with the adjusted ratio of light settings via respective radio signal receiver devices coupled with each of the respective two or more remote lighting devices.

In some examples the method may also include: causing thumbnail representations of full size photographic images stored on a memory of the camera to be sent from the camera to the PDA; causing the thumbnail representations to be displayed on a display of the PDA; using an interface on the PDA and selecting one of the thumbnail representations as a selected thumbnail image; causing the camera to send a full size photographic image corresponding to the selected thumbnail image to the intermediate device; causing the intermediate device to send the full size image to a wireless access point; and causing the wireless access point to send the full size image to a computing device coupled with a computer network. In some cases the causing the camera to send a full size photographic image corresponding to the selected thumbnail image to the intermediate device may be done using the interface on the PDA.

In some cases the camera may send one or more full size photographic image corresponding to the selected thumbnail image to the intermediate device. In other cases the camera may send a photographic image that is not full size. One or more images may be a smaller size, such as a smaller digital file size.

BRIEF DESCRIPTIONS OF THE FIGURES

Embodiments of the present invention will be readily understood by the written description along with reference to the accompanying drawings and photographs. Embodiments of the invention are illustrated by way of example and not by way of limitation in the accompanying pictures and/or figures.

Various example elements of the present invention have been provided graphically as figures and briefly described as follows.

DETAILED DESCRIPTION OF EMBODIMENTS OF THE INVENTION

Figure 1:
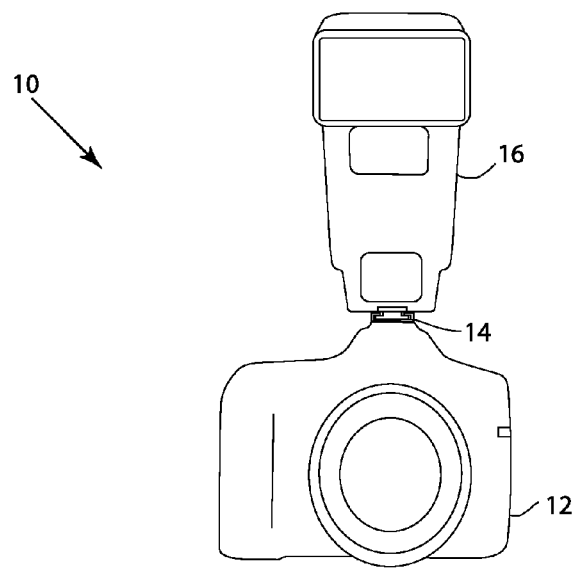
FIG. 1 is a front view illustrating a flash device as an example accessory device coupled with a camera.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)," that is, A is an optional element.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Various example embodiments may provide a photographer ("user") of a camera system with significantly improved options over prior art devices for the connectivity, scalability, and ability to adapt a communication system into a wide range of photographic equipment and other various systems which may be available to a user. Additionally, the present invention may provide a given user various new, improved, and novel means of communicating with other users which may be operating in the same environment.

In various example embodiments, a "communication system" may comprise any or all of the elements described herein individually or in plurality, in any order, in any arrangement, in any sequence, or in any capacity.

FIG. 1 is a front view illustrating an example camera and flash device configuration 10. The configuration 10 may include one or more cameras 12 such as but not limited to a digital single lens reflex ("DSLR") camera. The term "camera" may refer to any system, device, or apparatus that may be currently commercially available, or that may be developed in the future, which captures still or moving photographic images including any various aspect, or aspects, of videography, cinematography, still photography using film or image sensors, or any combination thereof. Generally, a user of embodiments described herein may use a digital single lens reflex "DSLR" camera, though the present invention may have various applications with any form of camera.

The camera 12 may provide a hot shoe connector 14 which may be used to couple an accessory device 16 to it. In the example illustrated a strobe flash device 16 is shown as an example accessory device. The hot shoe connector 14 may provide one or more electrical contacts, wherein the one or more electrical contacts may be able to send, or receive, various synchronization signals or activation signals to, or from, the flash device 16. The one or more electrical contacts of the hot shoe connector 14 may be capable of transmitting, or receiving, data between circuitry that may be included in the flash device 16 and circuitry that may be included in the camera 12. The data may be transmitted, and/or received, via one or more communication protocols, for example via a serial peripheral interface ("SPI"). The data communication protocol used may be commonly used or may be proprietary to a particular camera design.

Figure 2:
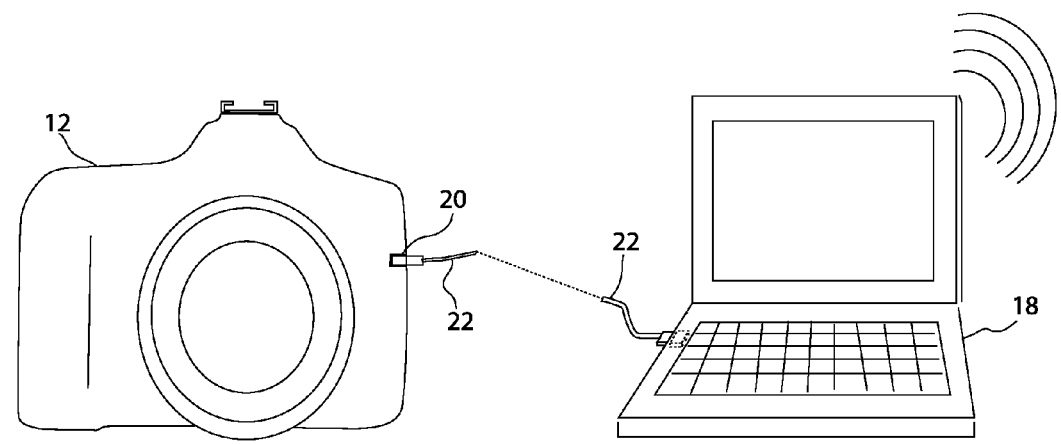
FIG. 2 is a somewhat schematic view illustrating a camera coupled with a computing device via a connector and cabling arrangement.

FIG. 2 is a schematic representation showing a camera 12 coupled with an example computing device 18. In some cases, such as in the illustrated example, the camera 12 may also include universal serial bus ("USB") circuitry which may be configured to operate in a USB "device" mode. The camera 12 may also include a USB port 20 which may serve to couple the camera 12 to the computing device 18, and may be capable of sending, and/or receiving, signals to the computing device. The coupling of the camera 12 with the computing device 18 may include a wire, or cable 22, or other arrangement including one or more wireless components. The computing device 18 may be configured to operate in USB "host" mode, or a USB "on-the-go" or "OTG" mode, and may be a personal computer such as a laptop computer.

The computing device 18, may be used to remotely control the camera 12 via, for example, a software application. The USB port 20 may also be used to do one or more of the following: access, or copy, digital images or video which may be stored on a memory card of the camera 12; activate the camera 12 to capture an image, start or stop recording video, or to stream digital images and/or video between the camera 12 and the personal computer; use the personal computer to query various settings of the camera 12 such as, but not limited to, a shutter speed setting, an aperture setting of a lens, and other various settings of use to a user; and use the personal computer to set various settings of the camera 12 including but not limited to the shutter speed setting, aperture setting of a lens, and other various settings of use to a user.

Figure 3:
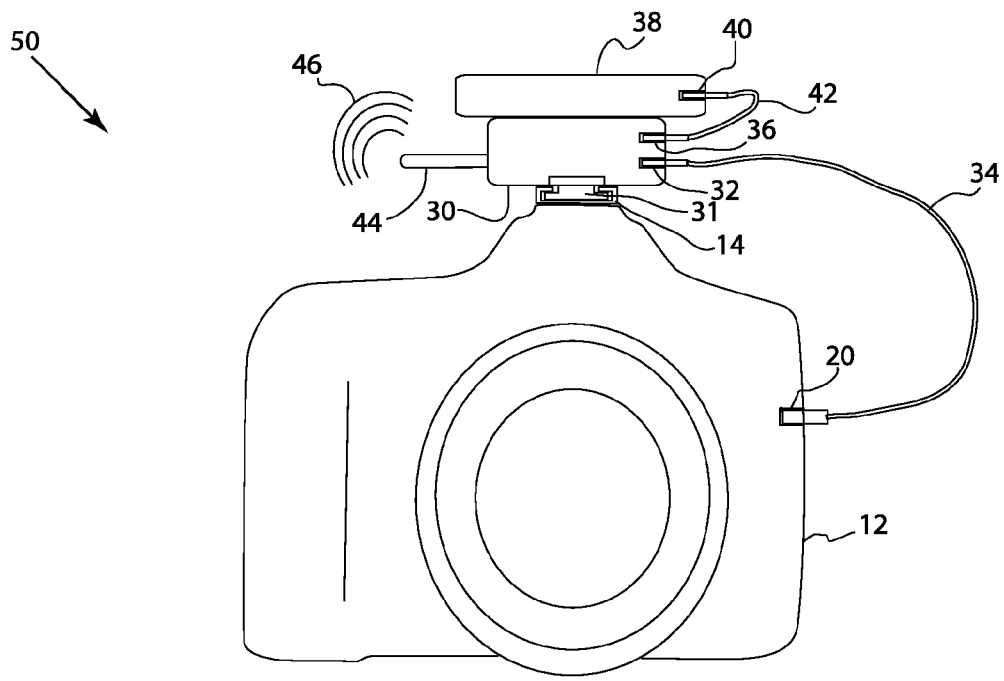
FIG. 3 is an exterior front illustration of a camera, an intermediate module in accordance with the present disclosure, and an example PDA device.

The USB port 20 may also enable the camera 12 to communicate with another device if the other device is capable of operating in a required, and/or appropriate, USB mode in order to interact with the camera 12. FIG. 3 is a front view illustrating a camera 12 coupled with an intermediate device 30 via the USB port 20 on the camera 12. The intermediate device 30 may also include an intermediate device USB port 32. The intermediate device 30 and the camera 12 may be operatively coupled for USB communication via a cable, or wire 34. In some cases the USB communication may be effected wirelessly. The intermediate device 30 may also be referred to as an intermediating device in that it may be configured to intermediate between the camera 12 and another device. The intermediate device 30 may also be configured to perform one, some, or all of the functions described above that the computing device may be configured to perform, namely: access, or copy, digital images or video which may be stored on a memory card of the camera 12; activate the camera 12 to capture an image, start or stop recording video, or to stream digital images and/or video between the camera 12 and the personal computer; use the personal computer to query various settings of the camera 12 such as, but not limited to, a shutter speed setting, an aperture setting of a lens, and other various settings of use to a user; and use the personal computer to set various settings of the camera 12 including but not limited to the shutter speed setting, aperture setting of a lens, and other various settings of use to a user.

The intermediate device 30 may also include an intermediate device hot shoe connector 31 which may be able to mate with a hot shoe connector 14 of the camera 12. The intermediate device hot shoe connector 31 may include electrical contacts which may electrically connect to appropriate electrical contacts which may be present on the hot shoe connector 31 of the camera 12 such that signals from the camera 12 or data signals such as but not limited to SPI data signals may be communicated between circuitry of the camera 12 and an MCU (discussed more later) of the intermediate device 30.

The intermediate device 30 may also include one or more additional USB ports 36. The one or more additional intermediate device USB ports 36 may be configured to couple with another device, and thereby to operatively couple the camera 12 to the other device. In the example illustrated the other device may be a Personal Digital Assistant (PDA) 38. The PDA 38 may include a USB port 40 that may be coupled with one of the USB ports 32, 36 included with the intermediate device 30 via a wire 42. The intermediate device 30 may also be coupled with the PDA 38 via a wireless coupling.

The intermediate device 30 may also be configured to communicate wirelessly with other devices in the photographic environment via an antenna 44. Wireless signals such as radio signals 46 are schematically illustrated emanating from the antenna 44. Various wireless protocols may be used. All or some of the elements shown may comprise a system 50. The system 50 may, in some cases, be referred to as a communication system 50. In some cases the system 50 may be referred to as a photographic system 50 in still other cases the system 50 may be referred to as a photographic communication system 50.

It will be understood that a camera may be available, or may become available, that it may be configured to operate in a USB "host" mode, or a USB "on-the-go" or "OTG" mode, and that such camera may also, or instead, be used in accordance with various embodiments. For example, various embodiments of the intermediate device 30 disclosed herein may be used to facilitate communication between the USB Host, or USB OTG enabled, camera and the PDA or other device.

Figure 4:
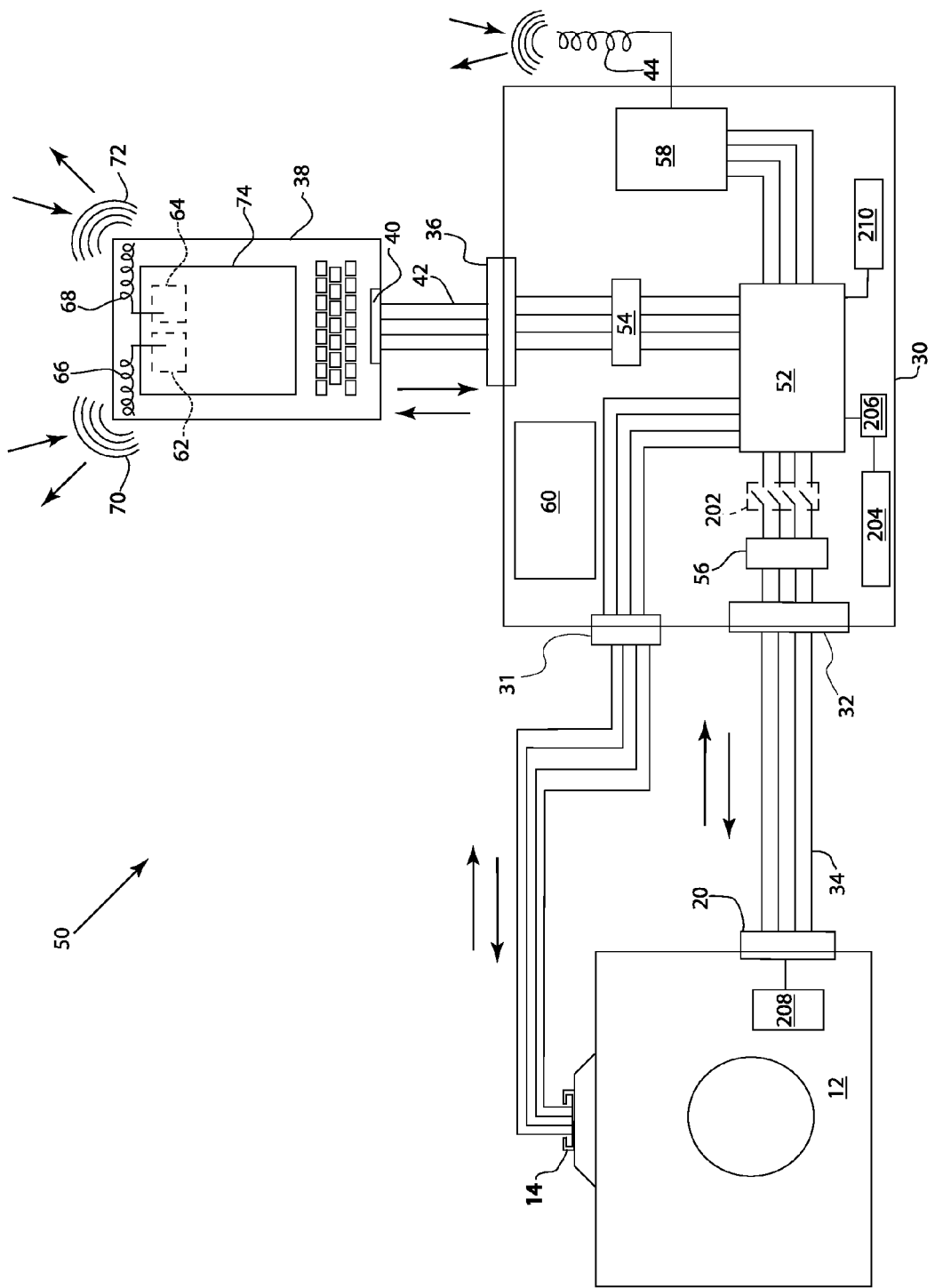
FIG. 4 is an exterior illustration of the display and controls of an example PDA device.

FIG. 4 is a schematic view illustrating additional components of the system 50 shown in FIG. 3. The communication system 50 may comprise one or more intermediate devices 30. The intermediate device 30 may include a microprocessor ("MCU") 52 or other circuitry which may be configured to run one or more software programs, or firmware which may process, input, and/or output, various signals.

The intermediate device 30 may also include one or more circuits, integrated circuits ("IC"), or interfaces ("USB interface") 54, 56, which may be capable of interfacing with a USB device via one or more of the USB ports 32, 36, wherein the USB interface 54, 56 may be capable of operating in a USB Host mode, and/or a USB on-the-go (OTG) mode. With some embodiments, functionality of the USB interface 54, 56 may be integral to the MCU 52, or as a peripheral feature of an MCU 52.

The intermediate device 30 may also include a radio signal transmitter and/or radio signal receiver and/or radio signal transceiver which may be hereinafter be referred to in any example, configuration, or embodiment as "radio module" 58. The radio module" 58 may be capable of sending, and/or receiving, radio signals via an antenna element 44 which may be included internal to the intermediate device 30 or external to the intermediate device 30. The radio module 58 may be electrically connected to the MCU 52. The radio module 58 may send, and/or receive, radio signals on any possible radio frequency band, with any possible radio frequency modulation, specification, protocol, or encoding standard which may be commercially in use or which may be configured to be proprietary to the intermediate module 30. The radio signals to, and/or from, the radio module 58 may operate on a frequency band allocated for, for example, Industrial Scientific and Medical ("ISM") uses which in North America may include various frequencies in the 300 Mhz to 500 Mhz bands, and which may include various frequencies in the 902 Mhz to 928 Mhz bands, and which may include various frequencies in the 2.4 Ghz bands, and which may include various frequencies in the 5.6 Ghz bands, and which may include various frequencies in other bands. In some examples radio signals to, and/or from, the radio module 58 may not necessarily fall into a band allocated for ISM use. In some examples radio signals to, and/or from, the radio module 58 may, or may not, be compatible with WiFi, and/or BlueTooth, and/or ZigBee, and/or other protocols allowing participation in a mesh network, and/or other protocols. For the purpose of the discussion of the present disclosure any radio signals which may be received by, or transmitted from, the radio module 58 may be referred to as "ISM signals".

In some examples, the intermediate device 30 may comprise a user interface 60 such as, but not limited to, various buttons, rotary dials, switches, indicator lights, a graphical display, a touch screen display, a microphone, an audio speaker, or any other component which may provide a useful indication to a user or which may allow a user to make any input or selection which may be perceptible to an MCU 52.

As discussed, the communication system 50 may include one or more of personal digital assistants PDAs 38. The one or more PDAs 38 may include but may not limited to an Apple iPhone, Apple iPod Touch, BlackBerry, Palm Pilot, or any other similar personal computing device which may also include a laptop computer, palm top computer, or personal computer. The PDA 38 may include a data connector or port 40 which may allow the PDA 38 to be coupled to a personal computer 38. The data connector 40 may be configured to send, and/or, to receive USB signals in a USB Host mode, a USB Device mode, a USB OTG mode, or any combination thereof, or any other USB mode currently in use or yet to be developed.

The PDA 38 may also include one or more radio modules 62, 64 which may allow the PDA 38 to send, and/or receive, radio signals via respective one or more antennas element 66, 68 or multiple antenna elements which may be contained internal to or external to or integral with the PDA 38. In some cases, the first radio modules 62 of the PDA 38 may send, and/or receive, radio signals 70 compatible with WiFi wireless networking that may be similar to, but may not limited to, that described by WiFi protocol 802.11b/g or similar specification, hereafter "WiFi signals" 70. The second radio module 64 of a PDA 38 may send and/or receive radio signals compatible with for example, a BlueTooth specification, hereinafter "BlueTooth signals" 72. The second radio module 64 of PDA 38 may send, and/or receive, radio signals to, and/or from, a wireless mesh network such as but not limited to a ZigBee network.

Figure 5:
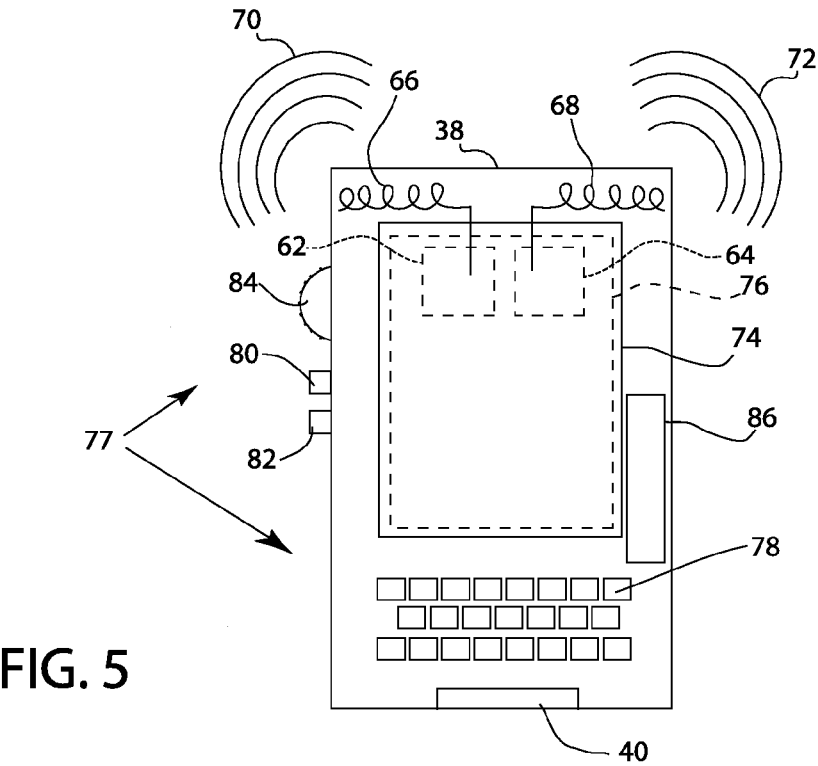
FIG. 5 is a simplified schematic view illustrating an intermediate device electrically coupled to various elements of a camera and a PDA device, a number of example signal flow paths between various elements.

FIG. 5 is a somewhat schematic view of an example PDA 38 showing more detail thereof. The PDA 38 may also include an interface that may include a display 74, such as a graphic or video display, wherein the display 74 may have integral or proximate to it a touch screen or touch position sensor which function as an interface 76, which may allow a user to interact with a PDA 38 by touching an area of interest on the display 74. The PDA 38 may also include additional, or alternative, interface elements 77 which may include any one or more, or any combination of a key pad 78, buttons 80, indicator lights 82, rotary dial(s) 84, thumb jog dials and/or selectors and the like which may allow a user to interact with a PDA 38.

The PDA 38 may further comprise a software or computer program, or an operating system which may allow invoking or executing one or more additional software or computer programs, and wherein a software or computer program or portion of the same may be designed, and/or compiled, by a third party company or the manufacturer of the PDA 38. Software or a computer program, an operating system, a third party program, a manufacturer program, or any portion thereof, together as a whole, in any individual part, or any logical arrangement may hereafter be referred to as "PDA software". The PDA 38 may include PDA software which may provide various graphical elements to a user via graphic display 74, and/or via other user interface 77, and may receive various inputs from a user via touch pad 76 and/or user other interface elements 77, and wherein the PDA software may be able to cause the PDA 38 to send and/or receive WiFi Signals and/or BlueTooth signals, and wherein the PDA software may be able to cause the PDA 38 to send and/or receive signals to and/or from a data connector 40 of the PDA 38.

The PDA 38 may include a battery 86 or other power source such as for example a rechargeable battery power source which may be integral with the PDA 38. The PDA 38 may provide a voltage or power supply to one or more electrical contacts of the data connector 40 of the PDA 38.

Figure 6:
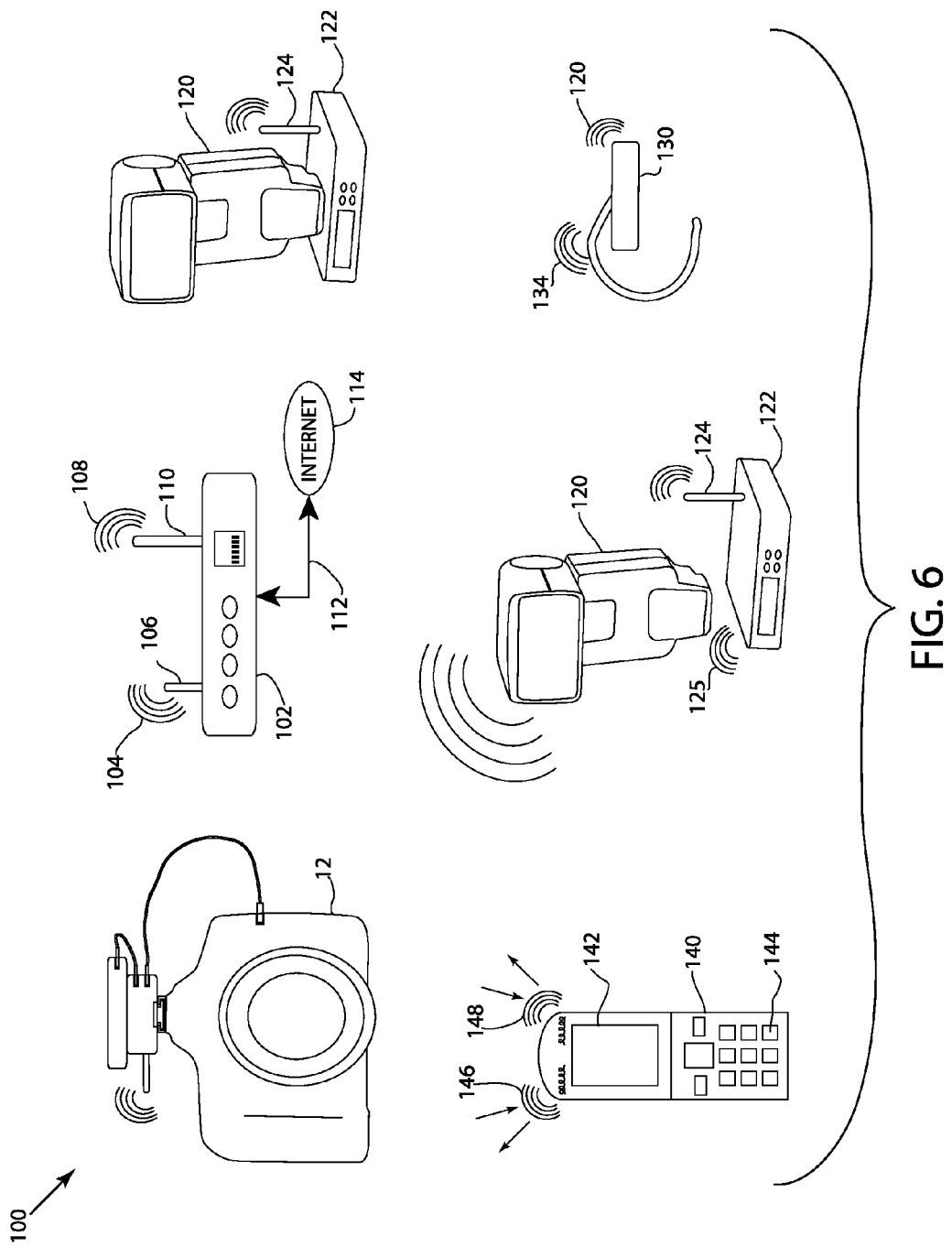
FIG. 6 is an operational illustration of an example communication system.

FIG. 6 is a system diagram illustrating an example communication, or photographic system 100 in accordance with various embodiments. The system 100 may comprise one or more wireless access points 102. The wireless access points 102 may include a first radio module that may be capable of sending, and/or receiving, WiFi signals 104 via an internal, or external antenna 106. The wireless access point 102, may also include a second radio module that may be capable of sending and/or receiving ISM signals 108 via an internal, or external antenna 110. The wireless access points 102 may also include any combination of radio module or radio modules capable of participating in a wireless mesh network such as but not limited to ZigBee networks. It is considered by the present disclosure that the various radio capabilities, and/or modules, which may be included within, or external to, the wireless access point 102 may be included within a single radio module or a plurality of radio modules, and may transmit and/or receive, radio signals using a single antenna element or multiple antenna elements.

The wireless access point 102 may include an MCU or circuitry which may run a software program or firmware which may be able to send and/or receive signals to, and/or from, any of the possible radio modules which may be comprised with the wireless access point 102. The firmware of the MCU may be able to relay various signals and/or data between the various radio modules which may transmit and/ or receive radio signals on any of the possible wireless protocols which may be comprised with the wireless access point 102. The wireless access point 102 may further include a connection which may be a wired connection 112 to another device, circuitry, network, or gateway which may further connect to a network including, but not limited to a local area network ("LAN"), or as illustrated in example system 100, to the Internet 114.

The communication system 100 may include one or more lighting devices 120 such as, but not limited to, a battery powered flash unit, a studio lighting unit, or any device which may provide illuminating light for the purpose of photographing a scene or subject. The one or more lighting devices 120 may include a radio module 122 which may include a radio signal receiver, and/or a radio signal transmitter. The radio module 122 may be located in, external to, formed integral with, or otherwise coupled to the lighting device 120. The radio module 122 may able to communicate through various means with the lighting device 120, and may use a radio signal receiver and/or radio signal transmitter and/or radio module, wherein the radio module 122 coupled to the lighting device 120 may be able to send and/or receive ISM signals, and/or WiFi signals, and/or BlueTooth signals, and/or wireless mesh signals. The radio module 122 may be capable of sending, and/or receiving, radio signals via an antenna element 124 which may be included internal to the radio module 122 or external to the radio module 122.

In one example embodiment the lighting device 120 may have a hot shoe connector that may be used to couple the radio module or an apparatus including a radio module 122 thereto. In another example embodiment, the lighting device 120 may have the radio module 120, or apparatus comprising a radio module 122, placed proximate to a lighting device 120 wherein the radio module 122, or apparatus may be able to communicate various signals, and/or data, to the lighting device 120 using pulsed, or coded, or constant signals of light "light signals" 124. The lighting device 120 may be responsive to light signals from radio module 122, or apparatus. In yet another example embodiment, the lighting device 120 which may be, for example, a studio type lighting device such as, but not limited to, commercial 'mono-light' type devices, may have coupled thereto an apparatus which may comprise a radio module via a cord or data connector between the studio lighting device, and an apparatus which may comprise a radio module. It is considered that any lighting device which could be perceptible of any radio module or apparatus which may comprise a radio module may be used.

The communication system 100 may include one or more users or people (not shown) which may be able to talk into or listen from any device capable of wireless interaction, such as but not limited to a commercially available BlueTooth head set or ear piece 130 (hereafter "BlueTooth headset 130"), wherein a BlueTooth headset 130 may be able to wirelessly communicate via BlueTooth signals 132 and/or WiFi signals 134, and/or wireless mesh signals and/or ISM signals.

In some examples, the communication system 100 may comprise one or more cellular telephones ("cell phones") 140 or portable computing systems which may or may not be similar to the PDA devices previously discussed. The cell phone 140 may provide a means of displaying information or indicators to a user such as, but not limited to, a graphic display 142. The cell phone 140 may provide a means of receiving various inputs from a user via a user interface 144 such as a keypad, touch screen, buttons, and the like. The cell phone 140 may provide one or more radio modules which may be able to wirelessly communicate via BlueTooth signals 146, and/or WiFi signals 148 and/or wireless mesh signals, and/or ISM signals, and/or optical signals via a light transmitter, and/or light receiver.

Methods and systems in accordance with the present disclosure may provide various means of interconnecting various components either electrically or wirelessly such that various embodiments may allow information, signals, data, settings, status, commands, synchronization of time critical events, and the like to be communicated between the various components. Embodiments may provide significant useful functionality to a user or users via hardware components which may already be owned by a user. Various functionally in accordance with various example embodiments may be discussed. It will be understood that far more possible uses, functions, flow paths of information, data, signals, synchronization, and the like may be realized using the various methods and systems in accordance with the present disclosure and as such, the following discussion should not be considered a limited list of functions, features, or uses; rather the following discussion illustrates only a few of the possible uses and functions provided to a user or users.

A PDA 38 may provide several hardware components which may be useful to a user interacting with a camera, various photographic devices, or various elements of a communication system, such as for example a graphic display 74, a user interface 76, 77 and the like. The PDA 38 may also provide hardware which may allow the PDA 38 to communicate with other devices via WiFi signals 70, BlueTooth Signals 72, wireless mesh signals, and so on.

The PDA 38 may have a data connector 40 which may be able to carry various USB signals. Generally, in an example where components may interface via USB, one of the components may be considered a "Host", while the other component may be considered a "Device" (for this discussion "Host" and "Device" may refer to the common naming and implications of said naming as would be known to one skilled in the art of designing USB interfaces for products, as the terms "Host", "Host Mode", "Device", and "Device Mode" may carry specific meaning when relating to USB communications). A Host may control the timing and flow of a communication with a device. Generally, it is not possible to directly interface two components having USB with one another if both components are operating in a USB "Device Mode", as one of the two must be able to control the flow of the communication. A USB port 40 of a camera 12 may only operate in USB Device mode. A data connector 40 of the PDA 38 may only operate in a USB Device mode. Typically a PDA 38 may not be able to communicate via a data connector using USB directly with a USB port 20 of a camera 12. Moreover, it is possible that a PDA software may not be configured to directly interface with the signals that may be provided by the camera 12 via USB port 20, and likewise, software of the camera 12 may not be configured to directly interface with the signals that may be provided by the PDA 38 via the data connector 40.

However, in accordance with various example embodiments of the present invention, an intermediate device 30 which may include an MCU 52 and firmware may provide two or more USB ports, or other ports, connectors, or arrangements of contacts which may otherwise convey USB signals. A user may then be able to, for example, select a camera shutter speed by touching a graphical control on a graphic display 74 via a touch pad 76. PDA software may interpret this selection and may send a signal indicating the new shutter speed via a data connector 40 via a USB cable 42 to a USB port 36 of an intermediate device 30, which may be perceptible by a USB interface 54 and eventually received by an MCU 52, wherein USB interface 54 may operate in a "Host" USB mode, and wherein the data connector 40 of the PDA 38 may operate in a "Device" USB mode. A firmware of MCU 52 may then reference the signal comprising the new shutter speed to a set of signals or data which the camera 12 may be responsive to carry out the desired function. The firmware of MCU 52 may then send the signal to which the camera 12 is responsive via a USB interface 56 via a USB port 32 which may carry the signal via a USB cable 34 to the USB port 20 of the camera 12, wherein the USB interface 56 may operate in a "Host" USB mode, and wherein the USB port 20 of the camera 12 may operate in a "Device" USB mode; and wherein a software of the camera 12 may respond to the received USB signal by setting its shutter speed to that indicated by the user when making a selection on PDA 38.

In consideration of the previous example, it is clear that any possible input or interaction that a user could possibly have with, or make perceptible to, the PDA 38, may be perceptible to the PDA software. The PDA software may then be designed or coded in such a way as to produce any possible data which may be exchanged via USB with the MCU 52 of the intermediate device 38. In some cases firmware of the MCU 52 of the intermediate device 30 may reference or translate that data exchanged from the PDA 38 into a second stream of data which may exactly match the first, or may be slightly altered, or may be formatted entirely differently so as to match that data signal which may be expected by the camera 12 to cause the camera 12 to respond by carrying out the desired or appropriate function, query, action, activation, or the like. It is possible that the MCU 52 of the intermediate device 30 may then exchange the second stream of data via USB with the camera 12. Software executable by the camera 12 may be configured to respond by carrying out the desired or appropriate function, query, action, activation, or the like. Thus it is clear and considered by the present disclosure that any function or operation of a camera can be queried, activated, set, or otherwise interacted with by PDA software via an intermediate device configured the same or similar to as discussed herein.

In a similar way, embodiments may enable the intermediate device 30 to query a digital image, video, or file from the camera 12, or a live view as would be seen through a view finder of the camera 12, or any other visual element. The intermediate device 30 may read a file from the camera 12, or copy a file to the camera 12, or alter a file of the camera 12. The intermediate device 30 may in a similar way exchange a file, digital image, video, or other meaningful data with the PDA 38.

The intermediate device 30 may be able to communicate with the hot shoe connector 14 of the camera 12. The hot shoe connector 14 of the camera 12 may allow the intermediate device 30 to become perceptible to various processes being carried out, or predicting various process which may be about to be carried out by the camera 12. In a similar way, the intermediate device 30 may be able to interact with signals to or from the camera 12 via the hot shoe connector 14 of the camera 12 which may comprise signals or data intended to control various camera lighting devices. These signals may be sent via, for example, radio module 58 via, for example, ISM signals, and/or these signals may be communicated to the PDA 38. The PDA 38 may execute PDA software that may enable a user to see, alter, set, control, or otherwise interact with various parameters that the camera 12 may intend to use in order to alter various characteristics or exposure values of a lighting device.

It should be clear from the present disclosure that the user interface 76, 77 of the PDA 38 may be used to input from, or output to, a user any useful status, indicator, signal, process, etc; and that those inputs from a user may be used to ultimately set any desired feature, function, status, activation, process, parameter, etc, of the camera 12 via the intermediate device 30; and in a similar way, similar indicators, signals, processes and the like may be communicated by the camera 12 to the PDA 38 via the intermediate device 30; and furthermore it should be clear that the radio module 58 which may transmit and/or receive ISM signals or other useful radio signals may also become involved in any communication process between the PDA 38, the camera 12, the intermediate device 30, and any other wireless device which may be present in the environment.

It is now discussed various ways a user may interact with a communications system having the various systems and methods of the present invention. Again this is not a complete list, but is intended to serve as various application examples, while it is understood and considered that many countless other various examples of applications and uses for the present invention may exist. The following discussion may speak generally in terms of hardware, systems, and/or methods previously described and thus may not include any or all numerical references corresponding to items illustrated in the provided figures. It is assumed that wherever a given hardware, apparatus, module, system, port, data path, interface, software, interface, electrical contact, antenna, protocol, or the like may be required to carry out the following examples that one skilled in the art would be able to implement, having the present disclosure before them, any specific arrangement, connection order, configuration, or other parameter of various hardware, software, and the like to carry out the described functionality of the examples described.

A user of a camera may call up on a display of a PDA via PDA software a chart or indicators of the current exposure settings of several lighting devices which may include a set ratio of light between them. The PDA, via an intermediate module, may query current set points of the required indicators from a camera and then sends the results back to the PDA where they may be displayed. The user may adjust the ratio set between the lighting devices via the interface of the PDA. The PDA may send the new set points back to an intermediate device. The intermediate device may store these settings for later use, and may communicate these settings back to the camera to update the settings within the camera. The user may then activate a shutter button of the camera. The camera may begin communicating with the intermediate device via the hot shoe of the camera. The intermediate device may provide the previously stored lighting set points to the camera as if it were itself a lighting device. When an activation or synchronization signal indicating a shutter is opening is perceived by the intermediate device either from a signal indicated by a USB port of the camera or the hot shoe connector of the camera, the intermediate device may send, via a radio module, ISM signals, or the like, which may be received by various receiving devices on various lighting devices such that the lighting devices operate with the desired synchronization and exposure values.

The user may like the resulting image. The user may call up a screen on the PDA which may allow selecting and sending of the image to another device. The user may be able to flip through some images stored on a memory card of his/her camera. The PDA may be sending signals to the camera via the intermediate device that would cause the camera to reference various image files stored on the memory card of the camera and to return results one by one as thumbnail size images. The images may be sent via the intermediate device back to the PDA where the thumbnails may be displayed on the graphic display of the PDA. The user may select a favorite image and may invoke a function via the PDA software to transmit the image to a computer server. The PDA software may then query the camera, via the intermediate device, to send the entire full sized data file corresponding to the requested image. The camera may send the resulting file to the intermediate device. The intermediate device may, via the radio module, transmit ISM signals which may be of a protocol or classification allowing for much longer range broadcasting of signals than WiFi. The ISM signals transmitted by the intermediate device may include data packets containing the image file copied from the memory card of the camera. Some distance away, a wireless access point having a radio that may be configured to receive ISM signals may receive the packet containing the image file. The wireless access point may then copy this file via a LAN to a local computer server or an Internet computer server. The wireless access point may alternately copy this file to another computer via WiFi signals between the wireless access point and another computer which may receive the file.

Figure 7:
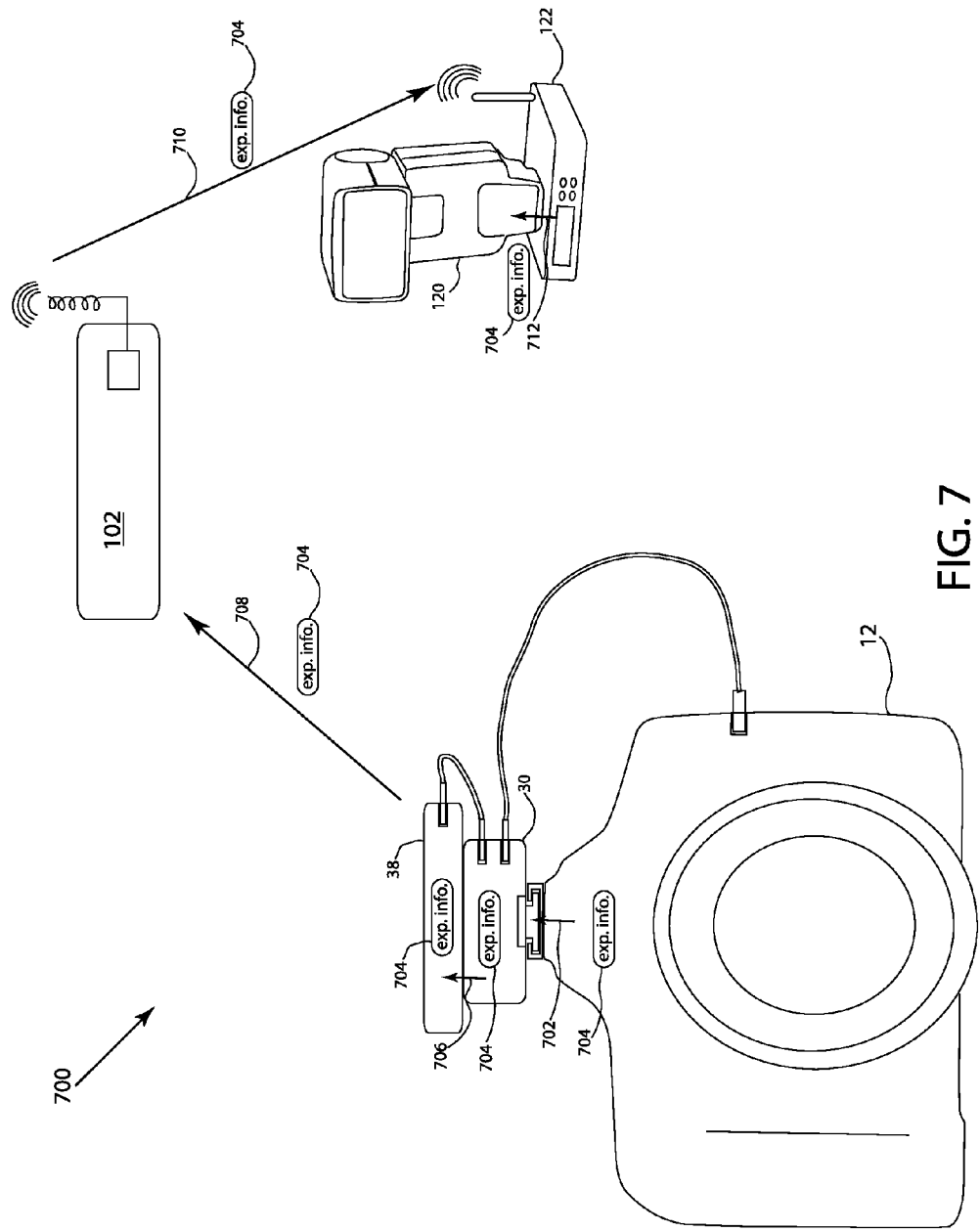
FIG. 7 is a system diagram illustrating an example user interaction with various embodiments.

FIG. 7 is a system diagram illustrating an example user interaction made possible with elements configured in accordance with the present disclosure. A user may have coupled to a camera 12 an intermediate device 30 that does not have a radio module and thus may not be able to transmit ISM signals. The user may activate the camera 12 by pressing the shutter button of the camera. The camera 12 may transmit, at 702, various data to the intermediate device 30 which may be coupled to the hot shoe of the camera. The intermediate device 30 may respond back to the camera as 12 if it were a lighting device. During the exchange between the intermediate device 30 and the camera 12, the intermediate device 30 may identify pertinent information which may correspond to exposure information 704 that should be communicated to an actual and remote wireless lighting device 120. The intermediate device 30 may communicate, at 706, this exposure information 704 to PDA 38 software of the PDA 38 which may be coupled to the intermediate device 30. The PDA 38 software may then send, at 708, the exposure information 704 via, for example, an Internet protocol such as TCP/IP via WiFi signals using a WiFi radio module and antenna contained within the PDA 38 to a wireless access point 102 which may further comprise a radio capable of sending ISM signals. The wireless access point 102 may receive the WiFi TCP/IP communication from the PDA 38 and may further relay, at 710, the exposure information via an ISM radio using ISM signals. The ISM signals may be long range and may easily travel to a radio receiver 122 which may be capable of receiving ISM signals and to which a lighting device 122 may be coupled. The remote radio receiver 122 may then cause the lighting device 120, via a data communication, at 712, to activate using the exposure information 704 from the camera 12 and/or the PDA 38. This exchange is possible as ISM signals may transmit at a bit rate of 250 Kbps or slower, while WiFi may transmit at speeds exceeding 1 Mbps. In such an example, a low latency WiFi communication path may be maintained between the PDA and the wireless access point if the PDA software actively manages the WiFi connection and may even send a continual stream of null data over said WiFi communication path to maintain a low latency connection, wherein live data may be impressed or otherwise inserted within the stream of null data when needed.

Hardware and Software

Various methods of connectivity that may be implemented by one skilled in the art of wireless computer networking, BlueTooth networking, industrial radio communication systems, embedded system development, electronic circuit design, microprocessors, software for use on microprocessors, and the like has been disclosed. The following brief summary more specifically discusses some of the components that may be used along with more specific examples of embodiment of the various portions of the present invention. In any or all examples it is clear, and should be understood, that the examples are much simplified for clarity and may not necessarily specifically reference every individual electrical component, piece, part, connection, or the like which may be used to construct the systems of the present invention. It would be known to one skilled in the art as to the appropriate use or placement of the various components which may be omitted from the discussion.

An intermediate device 30, or module, may have an exterior enclosure which may be constructed of light weight ridged material such as plastic or metal. The exterior may be shaped such that a PDA 38 may be easily mounted on it. The intermediate device 30 may have one or more radio transmitter and/or receiver modules 58 which may connect electrically to an appropriate antenna 44, or antenna tuning or filter network which may connect electrically to an antenna or antenna element. An antenna element may be comprised internal to, external to, or integral with the physical enclosure of the intermediate device 30. An example of a part which may be used for an appropriate radio module 58 may be a CC1101, available commercially from Texas Instruments, Inc. The radio module 58 may require a crystal oscillator to provide an intermediate frequency reference. Radio module 58 may be electrically connected to an MCU 52 such as an LM3S9B96 microprocessor available commercially from Texas Instruments, Inc./Luminary Micro. An MCU 52 may require an external crystal oscillator to provide a timing reference for a program clock. The suggested MCU part may include one or more USB interface peripherals which may be used to carry out some or all of the required USB functionality of the present invention.

With regard to USB interfaces, some USB interfaces may operate in an "on-the-go" mode which may enable the OTG compliant USB interface to act as either a Device mode USB interface or a Host mode USB interface, and thus, where required, a USB interface which may be required to operate in a Host USB mode may be replaced by a USB interface compliant with an OTG mode, as an OTG mode may provide the required functionality of a Host USB mode interface.

One or more USB interfaces of the intermediate device 30 may provide a switching part or multiplexor 202, or other circuitry which may be capable of electrically disconnecting a USB port of the intermediate module 30 from other circuitry of the intermediate device 30, and it is possible that the switching action may be controllable via a firmware of the MCU 52. In some examples, the camera 12 may alter its functionality or limit certain functionality when it is actively coupled via USB to another device. The ability to isolate the USB port by switching may allow the intermediate device 30 to activate a USB connection with the camera 12 and, when appropriate, to electrically disconnect a USB connection with the camera 12 to allow normal operation of the camera 12 as if it had not been connected via USB to any other devices.

A power source 204 such as a battery power source may be provided internal to or external to the intermediate device 30. The power source 204 may be a rechargeable battery which may be capable of recharging from a power source present on any connector or port via an appropriate charge regulation circuit. A voltage regulator 206 may be provided to regulate the power supply to various voltage levels and current levels required by the circuitry of the intermediate device 30. The intermediate device 30 may also draw operating power totally or partially from a power source 208, or voltage, present on the connector or port 20 of the camera 12 to which the intermediate device 30 is connected, or from a power source 86, or voltage present on a connector or port 40 or data connector of the PDA 38 to which the intermediate module 30 is connected. The intermediate device 30 may also provide power to the camera 12 or PDA 38 from the power supply 204 of an intermediate device 30 in a similar way.

The intermediate device 30 may have a memory 210 such as, but not limited to, an EEPROM memory wherein various data may be stored. The intermediate device 30 may provide, via an appropriate interface, a means by which a user may re-program, alter, or otherwise update a firmware or a portion of a firmware of the intermediate device 30 via a USB interface or other appropriate interface or connection It is understood that the intermediate device 30 may require various filtering, buffering, isolation, and other appropriate components that may ensure stable operation with various attached or coupled systems, hardware, or components.

The intermediate device 30 may include a physical support as a shield or cover which may be translucent to be slid into a groove or otherwise securely irremovably installed on the intermediate module such that the shield or cover may cover all or a portion of the user interface, touch pad, graphic display, or other feature of the PDA 38; wherein the PDA 38 may be mounted, clipped, taped, or otherwise secured proximate to, or in contact with, the intermediate device 30. Such a shield may help protect a display of the PDA 38 from being damaged during handling of a camera which may have coupled to it an intermediate device and/or PDA 38.

A USB cable 42 which may connect a data connector 40 of the PDA 38 to a USB port 36 of the intermediate device 30 may be replaced by a cable, assembly, apparatus or similar device which may have integral to the cable assembly, or installed at either end of a cable assembly, a device or circuitry which may allow a data connection such as a SPI connection to translate or otherwise relay in either direction SPI data communications with USB data communications. Some commercially available radio communication devices which may be available to photographers may provide an additional accessory hot shoe connector proximate to the radio communication device wherein the additional hot shoe connector may provide SPI data communications. In a similar way, it may be possible to provide a firmware to the radio communication device comprising an additional accessory hot shoe connector that may be able to switchably cause a circuitry internal to the radio communication device to send either SPI data communications over the additional accessory hot shoe connector or to send USB communications over the additional accessory hot shoe connector. In such a case it may be possible to electrically connect a PDA to an intermediate device via the additional accessory hot shoe connector that may be present on the radio communication device.

In various examples and embodiments, a USB connector 20 of a camera 12 does not necessarily have to be a USB connector. An alternate connector which may provide similar functionality as that described herein and which may be caused to communicate various signals and/or data via any connection, wire, wires, port, contacts or the like of an intermediate device 30 such that an MCU 58 of the intermediate device 30 may communicate with the camera 12 may be used in place of a USB port 20 of the camera 12. Some possible examples may include an HDMI port of a camera, a remote cable release trigger port of the camera, an audio/video port of the camera, an accessory contact or port of the camera intended for the attachment of an accessory trigger grip, as well as any connector or port which may be available on a camera yet to be developed may be used.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An intermediate device comprising:
   a first USB (Universal Serial Bus) port configured to couple with a USB port on a camera;
   circuitry configured to send USB signals to the camera and to receive USB signals from the camera, and to operate in USB Host mode, and/or USB OTG (on the go) mode, as the camera operates in Device mode;
   a second USB port configured to couple with the PDA (Personal Digital Assistant); and
   a microprocessor configured to enable a display of the PDA to indicate settings of respective remote lighting devices, and further configured to receive one or more adjusted settings, a memory configured to store the one or more adjusted settings, the microprocessor further configure to communicate the one or more adjusted settings to the respective remote lighting device(s);
   a radio module configured to communicate via radio waves with one or more radio signal receiving devices respectively coupled for communication with the remote lighting devices;
   wherein the circuitry is further configured to send USB signals to the PDA and to receive USB signals from the PDA, and to operate in USB Host mode, and/or USB OTG mode, as the PDA operates in Device mode.

2. The device of claim 1, further comprising a switching part configured to electrically disconnect the circuitry from the first USB port.

3. The device of claim 1, wherein the two or more settings includes an indication of a ratio of light settings between two or more remote lighting devices, and wherein the microprocessor is further configured to receive an adjusted ratio of light settings, and to communicate the adjusted ratio of light settings to the one or more remote lighting devices upon receipt of a shutter activation signal.

4. The device of claim 1, wherein the microprocessor is further configured to cause the PDA to send exposure information via WiFi to one or more radio signal receiving devices respectively coupled with, and/or included within one or more remote lighting devices.

5. The device of claim 1, wherein the microprocessor is further configured to cause the PDA to send activation and/or trigger information via WiFi to one or more radio signal receiving devices respectively coupled with, and/or included within one or more remote lighting devices.

6. The device of claim 1, wherein the microprocessor is further configured to communicate the one or more adjusted settings to the respective remote lighting device(s) upon receipt of a shutter activation signal.

7. The device of claim 1, further comprising a device hot shoe connector configured to couple with a camera hot shoe connector, the device configured to send signals to and receive signals from the camera via the device hot shoe connector.

8. A system comprising:
   an intermediate device configured to be operatively interposed between a camera and a PDA (Personal Digital Assistant), the intermediate device including:
     a first USB (Universal Serial Bus) port configured to couple with a USB port on the camera;
     circuitry configured to send USB signals to the camera and to receive USB signals from the camera, and to operate in USB Host mode, and/or USB OTG (on the go) mode, as the camera operates in Device mode;
     a second USB port configured to couple with the PDA; and
     the circuitry further configured to send USB signals to the PDA and to receive USB signals from the PDA, and to operate in USB Host mode, and/or USB OTG mode, and the PDA operates in Device mode;
   a display on the PDA, wherein the PDA is configured to:
     display on the display two or more settings of respective remote lighting devices;
     receive a user inputted adjustment of at least one of the settings;
     send the at least one adjusted settings to the intermediate device;
   a radio module included in the intermediate device and configured to send radio signals to one or more radio signal receiving devices respectively coupled for communication with the remote lighting devices;
   wherein the intermediate device is further configured to recognize a signal from the camera, and to cause the radio module to send to the one or more radio signal receiving devices the at least one adjusted settings in order to cause each respective remote lighting device to emit a flash of an intensity in accordance with the respective adjusted setting, upon recognition of the signal from the camera; and
   wherein the intermediate device further includes a microprocessor configured to enable the PDA to do one or more of:
     access image data stored on a memory card of the camera and to display one or more images captured by the camera on a display of the PDA;
     copy image data stored on the memory card of the camera to a memory resident on the PDA;
     activate the camera to capture an image;
     query settings of the camera;
     set and/or change settings of the camera; and
     control a remote piece of photographic equipment.

9. The system of claim 8, further comprising:
   a remote lighting device configured to emit a pre-flash of a known intensity to at least partially illuminate a subject in a photographic environment, the camera configured to measure an amount of light reflected off the subject including light from the pre-flash and directed through a lens of the camera, the camera configured to calculate a preferred exposure value for illuminating the subject with a main-flash based on the measured amount of light and to communicate the preferred exposure value as exposure information;
   wherein the microprocessor of the intermediate device is further configured to identify the exposure information sent by the camera, and to communicate the exposure information from the intermediate device to the PDA via the second USB port;
a wireless access point;
wherein the PDA is configured to send the exposure information from the PDA to the wireless access point using an internet communication protocol;
wherein the wireless access point is configured to relay the exposure information to a remote radio receiving device using radio waves; and
wherein the remote radio receiving device is configured to communicate the exposure information to the remote lighting device to cause the flash device to emit the main-flash using the preferred exposure value for illuminating the subject.

10. The system of claim 8,
wherein the two or more settings includes a ratio of light settings between two or more remote lighting devices and the at least one adjusted setting includes a user inputted adjustment of the ratio of light settings;
wherein the signal is a shutter activation signal; and
wherein the intermediate device is further configured to cause the radio module to send to the two or more radio signal receiving devices the adjusted ratio of light settings in order to cause each respective two or more remote lighting devices to emit flashes of an intensity in accordance with the adjusted ratio of light settings upon recognition of a shutter activation signal.

11. The system of claim 10, wherein the intermediate device is further configured to store the adjusted ratio of light settings in a memory resident on the intermediate device until the shutter activation signal is recognized.

12. The system of claim 8, wherein the intermediate device is further configured to:
cause thumbnail representations of full size photographic images stored on a memory of the camera to be sent from the camera to the PDA via the intermediate device;
and wherein the PDA includes a display and an interface; and
wherein the PDA is configured to:
display the thumbnail representations on the display;
recognize, from a user using the interface, a selection of one of the thumbnail representations as a selected thumbnail image;
cause the camera, through a selection made with the interface on the PDA, to send a full size photographic image corresponding to the selected thumbnail image to the intermediate device;
receive an input to send the full size image to a wireless access point and to send the full size image to the wireless access point;
cause the wireless access point to send the full size image to a computing device coupled with a computer network.

13. A method of using a Personal Digital Assistant (PDA) as a control, or information retrieval aid in a photographic setup, the method comprising:
operatively coupling a first USB (Universal Serial Bus) port of an intermediate device to a USB port of a camera, and operating the intermediate device in USB Host mode as the camera operates in USB Device mode;
operatively coupling a second USB port of the intermediate device to a USB port of the PDA, and operating the intermediate device in USB Host mode as the PDA operates in USB Device mode;
displaying two or more settings of respective remote lighting devices on a display of the PDA;
adjusting at least one of the displayed settings using an interface of the PDA;
sending the at least one adjusted setting to the intermediate device;
storing the at least one adjusted setting in a memory resident on the intermediate device;
sending to the respective remote lighting devices a setting in accordance with the at least one adjusted setting; and
using the PDA to:
query settings of the camera; and
control one or more of the settings of the camera.

14. The method of claim 13, further comprising: performing one or both of:
accessing image data stored on a memory card of the camera and viewing one or more images captured by the camera on a display of the PDA; and
copying image data stored on the memory card of the camera to a memory resident on the PDA.

15. The method of claim 13, further comprising:
activating the camera to capture an image.

16. The method of claim 13, further comprising:
controlling a remote piece of photographic equipment.

17. The method of claim 16, wherein controlling a remote piece of photographic equipment includes:
identifying exposure information sent by the camera with the intermediate device;
communicating the exposure information from the intermediate device to the PDA;
relaying the exposure information to a remote radio receiving device; and
communicating the exposure information via WiFi from the remote radio receiving device to the remote piece of photographic equipment wherein the remote piece of photographic equipment is a flash device responsive to the exposure information.

18. The method of claim 17, wherein the relaying the exposure information to a remote radio receiving device includes:
sending the exposure information from the PDA to a wireless access point using an internet communication protocol;
relaying the exposure information to the remote radio receiving device with the wireless access point.

19. The method of claim 17, wherein the identifying exposure information sent by the camera includes receiving the exposure information with the intermediate device via a hot shoe connector on the intermediate device mated with a hot shoe connector on the camera.

20. The method of claim 13, further comprising:
displaying a ratio of light settings between two or more remote lighting devices on the display of the PDA;
adjusting the ratio of light settings using an interface of the PDA;
sending the adjusted ratio of light settings to the intermediate device;
storing the adjusted ratio of light settings in a memory resident on the intermediate device;
sending, to the two or more remote lighting devices, via radio signals, adjusted lighting settings in accordance with the adjusted ratio of light settings; and
wherein the sending is performed with a radio device of the intermediate device via respective radio signal receiver devices coupled with each of the respective two or more remote lighting devices.

21. The method of claim 20, wherein the sending, with a radio device of the intermediate device, to the two or more remote lighting devices, via radio signals, adjusted lighting settings occurs upon receiving a shutter activation signal from the camera.

22. The method of claim 20, wherein the sending, with a radio device of the intermediate device, to the two or more remote lighting devices, via radio signals, adjusted lighting settings occurs prior to receiving a shutter activation signal from the camera.

23. The method of claim 13, further comprising:

causing thumbnail representations of full size photographic images stored on a memory of the camera to be sent from the camera to the PDA;

causing the thumbnail representations to be displayed on a display of the PDA;

using an interface on the PDA and selecting one of the thumbnail representations as a selected thumbnail image;

causing the camera to send an image corresponding to the selected thumbnail image to the intermediate device;

causing the intermediate device to send the image by radio signal to a device that is capable of receiving the image.

\* \* \* \* \*